(12) United States Patent
Merritt

(10) Patent No.: US 11,928,173 B1
(45) Date of Patent: Mar. 12, 2024

(54) DYNAMIC WEB APPLICATION BASED ON EVENTS

(71) Applicant: Massachusetts Mutual Life Insurance Company, Springfield, MA (US)

(72) Inventor: Sears Merritt, Groton, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

(21) Appl. No.: 17/867,312

(22) Filed: Jul. 18, 2022

Related U.S. Application Data

(63) Continuation of application No. 16/111,696, filed on Aug. 24, 2018, now Pat. No. 11,392,664.

(60) Provisional application No. 62/551,659, filed on Aug. 29, 2017.

(51) Int. Cl.
*G06F 16/957* (2019.01)
*G06F 16/955* (2019.01)
*G06F 16/9535* (2019.01)
*H04L 67/50* (2022.01)

(52) U.S. Cl.
CPC ........ *G06F 16/9577* (2019.01); *G06F 16/955* (2019.01); *G06F 16/9535* (2019.01); *H04L 67/535* (2022.05)

(58) Field of Classification Search
CPC ............... G06F 16/9577; G06F 16/955; G06F 16/9535; H04L 67/22
See application file for complete search history.

(56) References Cited

U.S. PATENT DOCUMENTS

| | | | |
|---|---|---|---|
| 6,993,586 B2 | 1/2006 | Chen et al. | |
| 8,219,583 B2 | 7/2012 | Moitra et al. | |
| 9,195,743 B2 | 11/2015 | Piwowarski et al. | |
| 9,703,880 B2 | 7/2017 | Liesche et al. | |
| 10,002,396 B2 | 6/2018 | Isaacson et al. | |
| 10,049,169 B2 | 8/2018 | Catlin et al. | |
| 10,915,300 B2 | 2/2021 | Blumenfeld et al. | |
| 10,943,217 B1 | 3/2021 | Rozin et al. | |
| 2006/0064411 A1 | 3/2006 | Gross et al. | |
| 2008/0148193 A1 | 6/2008 | Moetteli | |
| 2009/0222329 A1* | 9/2009 | Ramer | G06Q 30/0261 707/999.009 |
| 2009/0222737 A1* | 9/2009 | Liesche | H04L 67/56 715/205 |

(Continued)

*Primary Examiner* — Suraj M Joshi
*Assistant Examiner* — Jaren Means
(74) *Attorney, Agent, or Firm* — Foley & Lardner LLP

(57) ABSTRACT

Disclosed herein are embodiments of systems, methods, and products comprises an analytic server, which dynamically predicts future events for web users. The analytic server generates prediction models based on historical click-through analytics data received from the web server. The analytic server captures the current event (e.g., the current operation of the web user) on the web page, and determines the next event by predicting the web user behavior using the prediction models on an event-by-event basis. The analytic server also queries the web user data from a database to better understand the web user's intention, and improve the prediction accuracy. The analytic server modifies the HTML code to display the web page to include a graphical user interface comprising the predicted event. Based on the web users' reactions to the predicted event, the analytic server updates the prediction models.

20 Claims, 4 Drawing Sheets

(56) References Cited

U.S. PATENT DOCUMENTS

| | | |
|---|---|---|
| 2011/0087966 A1 | 4/2011 | Leviathan |
| 2016/0360382 A1 | 12/2016 | Gross et al. |
| 2017/0139879 A1 | 5/2017 | Sharifi et al. |
| 2018/0349483 A1* | 12/2018 | Carlisle .................. G06F 9/451 |
| 2019/0196932 A1 | 6/2019 | Adika et al. |

* cited by examiner

DYNAMIC WEB APPLICATION BASED ON EVENTS

CROSS-REFERENCE TO RELATED APPLICATIONS

This application is a continuation of U.S. patent application Ser. No. 16/111,696, filed Aug. 24, 2018, which claims priority to U.S. Provisional Patent Application Ser. No. 62/551,659, filed Aug. 29, 2017, each of which is hereby incorporated by reference in its entirety for all purposes.

TECHNICAL FIELD

This application relates generally to methods and systems for dynamic displaying of web applications based on user interactions.

BACKGROUND

A website may include numerous links providing users with different products, services, advertisements, documents, and other related information. In addition, each web page within the website may include links redirecting users to other web pages. Because of the interconnected nature of web pages within websites, navigating through different web pages to find the desired data (e.g., web page) may be frustrating and time-consuming. In some existing and conventional methods, a website may offer a website directory (e.g., website map) that classifies different information, functionalities, and/or services provided by the website. For instance, website directories may classify different information or functionalities into different categories and provide a corresponding link for each category, set of information, and/or services that directs users to the desired web page.

However, these conventional methods still require users to navigate through web directories and manually search for the desired content/web pages. Conventional methods further require users to be familiar with the website and require the user to navigate to the desired web page. In other existing and conventional methods, a website may deploy a chatbot to assist users. For example, a website may display a chat box allowing users to inquire regarding their desired content. However, these conventional methods and solutions have also created several shortcomings and a new set of technical challenges. For instance, the results displayed via the chatbot is based on key words searching, inputted by the user into the chat box, which may not be accurate (e.g., key words may be too broad or too narrow). Further, manually searching the web directories or employing the chatbot is still a time consuming process, which inevitably creates a negative user experience. While some other conventional methods provide prediction and recommendation services based on the web users' historical behavior, these conventional methods and solutions are not able to provide an accurate and fine-grained real time prediction capability of web users' intentions. That is, these conventional methods are limited to the users' past behavior and historical data.

SUMMARY

For the aforementioned reasons, there is a need for a more accurate and efficient system and method that would allow a server to optimize dynamic web applications based on events. Discussed herein are systems and methods for dynamically capturing each event of the web users' behavior in real time and optimizing the web applications by providing functionality on the web applications based on predictions on the web users' intentions or future behaviors using the captured event on an event-by-event basis.

In one embodiment, a computer implemented method comprises continuously monitoring, by a server, a current interaction between a user and a website displayed on an electronic device; receiving, by the server from the electronic device, a user identifier comprising authentication data associated with the user; querying, by the server, a web user database to receive data associated with the user based on the user identifier; executing, by the server, a prediction model to determine a next event corresponding to a future interaction between the user and the website, the prediction model being configured to use artificial intelligence to learn a user behavior pattern based on training of historical data comprising activities by other users on that website and corresponding next events and then predict the next event by applying the received data and the current interaction monitored by the server; retrieving, by the server from a webserver configured to host the website, HTML code associated with the website; generating, by the server, an interactive graphical component comprising an interactive hyperlink configured to transfer the user to a second web page corresponding to the next event determined by the prediction model; and dynamically displaying, by the server, the interactive graphical component by modifying the HTML code to display the interactive graphical component on a foreground of the website.

In another embodiment, a computer system comprises a web server hosting a website, a server in communication with the web server and configured to continuously monitor a current interaction between a user and a website displayed on an electronic device; receive from the electronic device, a user identifier comprising authentication data associated with the user; query a web user database to receive data associated with the user based on the user identifier; execute a prediction model to determine a next event corresponding to a future interaction between the user and the website, the prediction model being configured to use artificial intelligence to learn a user behavior pattern based on training of historical data comprising activities by other users on that website and corresponding next events and then predict the next event by applying the received data and the current interaction monitored by the server; retrieve from the webserver configured to host the website, HTML code associated with the website; generate an interactive graphical component comprising an interactive hyperlink configured to transfer the user to a second web page corresponding to the next event determined by the prediction model; and dynamically display the interactive graphical component by modifying the HTML code to display the interactive graphical component on a foreground of the web site.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
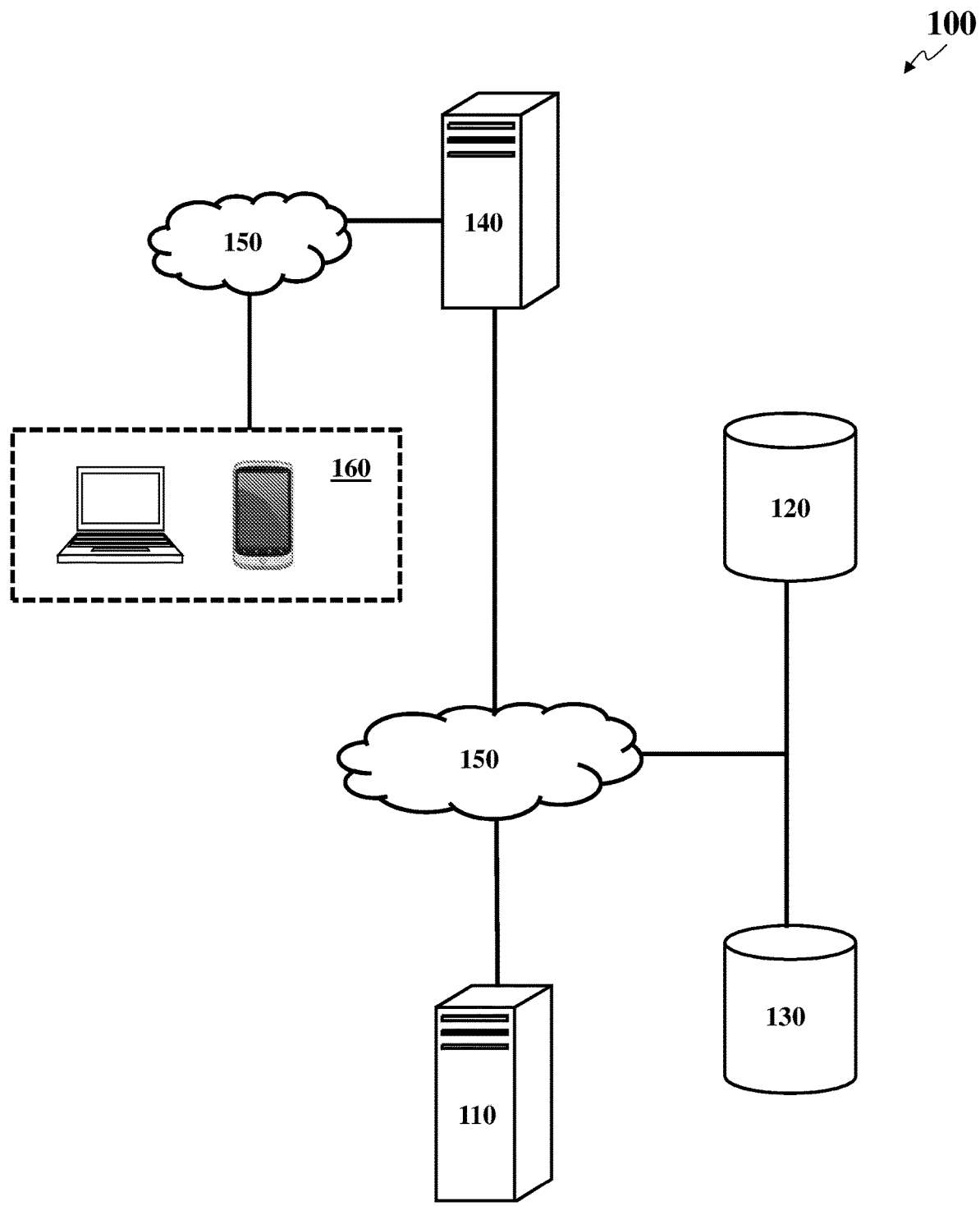
FIG. 1 illustrates a computer system for optimizing dynamic web application based on events, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates components of a system 100 for optimizing dynamic web application based on events, according to an embodiment. The system 100 may comprise an analytic server 110, a web user database 120, a prediction model database 130, and a web server 140, that are connected with each other via hardware and software components of one or more networks 150. Further, the web server 140 may be connected with a set of electronic devices 160 of web users via the network 150 or another network similar but separate and distinct from the network 150. The web server 140 may host a website with various web pages. Web users may visit the web pages of the website through electronic devices 160. The web user (operating the electronic devices 160) may perform various operations on the web pages, such as clicking on buttons/hyperlinks, changing account settings, searching certain information, requesting services and/or products, and the like, using their electronic devices 160. Examples of the network 150 include, but are not limited to, Local Area Network (LAN), Wireless Local Area Network (WLAN), Metropolitan Area Network (MAN), Wide Area Network (WAN), and the Internet. The communication over the network 150 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components, configured to optimize dynamic web application based on events. The analytic server 110 may be logically and physically organized within the same or different devices or structures, and may be distributed across any number of physical structures and locations. The analytic server 110 may continuously monitor a website hosted by the web server 140 and execute one or more component software models to optimize the website. The analytic server may access the website via obtaining authorization of the web server 140 and determine the event occurred on the website (e.g., the clicking, number of times that the user has interacted with a hyperlink, wiping, hovering, selecting, and other operations by a web user). The analytic server may also monitor time attributes of the user's interactions with the website. For instance, the analytic server may identify how long the user hovers over a hyperlink or how fast (after logging in) interacts with a hyperlink. The analytic server 110 may determine a next event for the web user based on the web user's operation/event and the prediction models obtained from the prediction model database 130.

Furthermore, the analytic server may access the web user database 120 via obtaining authorization from the web server 140, and receive the data associated with the specific web user. The analytic server 110 may utilize the web user data to improve the prediction accuracy. For example, the analytic server 110 may learn that the web user is a customer purchasing a certain product regularly at the beginning of the month. The analytic server 110 may determine that the web user is probably looking to buy the product again at the beginning of a new month, and provide a quick link/button for buying the product.

The analytic server 110 may monitor the event on a website and predict the next event on a micro scale. For example, when a web user is looking for a specific function or button on a website, the web user may need to go through a flow of events by selecting/clicking a series links or buttons, where each clicking/selecting is an event. The analytic server 110 may have prediction models trained to include different event flows or paths. The analytic server 110 may monitor each event through the web server 140 consider the dynamic change of web user's behaviors on an event-by-event basis, and predict, in real time, which path or event flow the web user is going through. For example, every time the web user clicks or selects a feature of a website, the analytic server 110 may predict the web user's intention and modify the HTML code of the web page to provide a quick link to the user's intended service.

The analytic server may provide different options based on the prediction results. Thus, the analytic server may direct the user to the intended function directly and without having to go through a series of events. As a result, such fine-grained prediction process may save the web user's time and further improve the user experience.

The web user database 120 may be any non-transitory machine-readable media configured to store data, including the web users' basic information and transaction data. For example, assuming the website is an online shopping website, the web user database 120 may include web users' age, gender, address, marital status, health status, and the like, such as other demographic data. In addition, the web user database 120 may include the products the web users previously bought, the transaction dates, the transaction amounts, the feedbacks/reviews of the products and the like. The database 120 may include other related data about the web users that may be used to understand customers' needs. The web server 140 may collect the web users' information and store the information into the web user database 120. Even though shown as separate servers, it is expressly understood that a single server may act as the analytics server 110 and the web server 140.

The analytic server 110 may need authorization to access the web user database 120. The analytic server 110 may request the web server 140 to generate the authorization token and transmit the token to the analytic server 110. The analytic server 110 may obtain authorization using any other authentication methods.

The prediction model database 130 may be any non-transitory machine-readable media configured to store history of web users' events and click-through analytics data, such as a library of click stream and event flow information. The web server 140 may observe the web users' behaviors by monitoring event flows on the website, such as the click stream, and/or other operations. The analytic server 110 may require such click-through analytics data from the web server 140, and store the data in the prediction model database 130.

Furthermore, the analytic server 110 may utilize the statistical data of observed event flows from various web users to train one or more prediction models. Specifically, the prediction models may determine a web user's intention, future behavior, or future event based on the web user's current behavior/operation.

The analytic server 110 may train the prediction models using machine-learning algorithms and store the prediction models in the prediction model database 130. In one or more embodiments, the analytic server 110 may employ one or more algorithms and/or combination of different algorithms, such as neural networks, clustering, and support vector machines (SVMs), and association rules for predictive modeling. In addition, the analytic server may update the prediction models based on the web users' reactions to the prediction results.

The web server 140, also called an HTTP server, may be any computing device comprising a processor and other computing hardware and software components, configured to host content, such as a website. A website is a collection of related web pages, including multimedia content, typically identified with a common domain name, and published on at least one web server. Web users operating electronic devices 160 may access the website by referencing a uniform resource locator (URL) that identifies the site. A website may be accessible via one or more networks 150 including a public Internet Protocol (IP) network, such as the Internet, or a private local area network (LAN).

The web server 140 may also comprise software that retrieves and delivers the web pages in response to requests from the website's users operating electronic devices 160. For example, when a web user issues a request to access certain information from a website, the web server 140 may retrieve and deliver the web pages corresponding to the requested information to the web user's electronic device. Web pages are documents, typically composed in plain text interspersed with formatting instructions of Hyper Text Markup Language (HTML, XHTML). Web pages from one website may incorporate components from other websites with suitable markup anchors. The web server 140 may transport the web pages with Hypertext Transfer Protocol (HTTP), which may optionally employ encryption (HTTP Secure, HTTPS) to provide security and privacy for the user. Web pages can be viewed or otherwise accessed from a range of computer-based and Internet-enabled electronic devices 160 of various sizes, including desktop computers, laptops, PDAs and cell phones.

The electronic devices 160 may be any computing device allowing a web user to interact with web server 140. The electronic devices 160 may be any computing device comprising a processor and non-transitory machine-readable storage medium allowing the electronic devices 160 to interact with the web server 140. The examples of the computing device may include, but are not limited to, a desktop computer, a laptop, a personal digital assistant (PDA), a smartphone, a tablet computer, and the like. The electronic devices 160 may comprise any number of input and output devices supporting various types of data, such as text, image, audio, video, and the like.

When a web user visits the website hosted on the web server 140 through the electronic devices 160, the electronic devices 160 may transmit credentials from the web users' inputs to the web server 140, from which the web server 140 may authenticate the web user and/or determine a user role. The electronic devices 160 may comprise any number of input devices configured to receive any number of data inputs, including various types of data inputs for authentication (e.g., username, password, certificate, and biometrics). In one embodiment, after the web server 140 determines the web user role based on the credentials, the analytic server 110 may learn the web user identifier through the web server 140. In prediction process, the analytic server may query the web user related data from the web user database 120 using the user identifier.

The analytic server 110 may collect the click-through analytics data from various web users regardless they are registered or not, and use the prediction models trained from the various web users' data for prediction. Although the web user data may help the analytic server 110 predict the user behavior more accurately, in some other embodiments, the analytic server may conduct prediction without the specific web user's data (e.g., predict for unregistered users).

Figure 2:
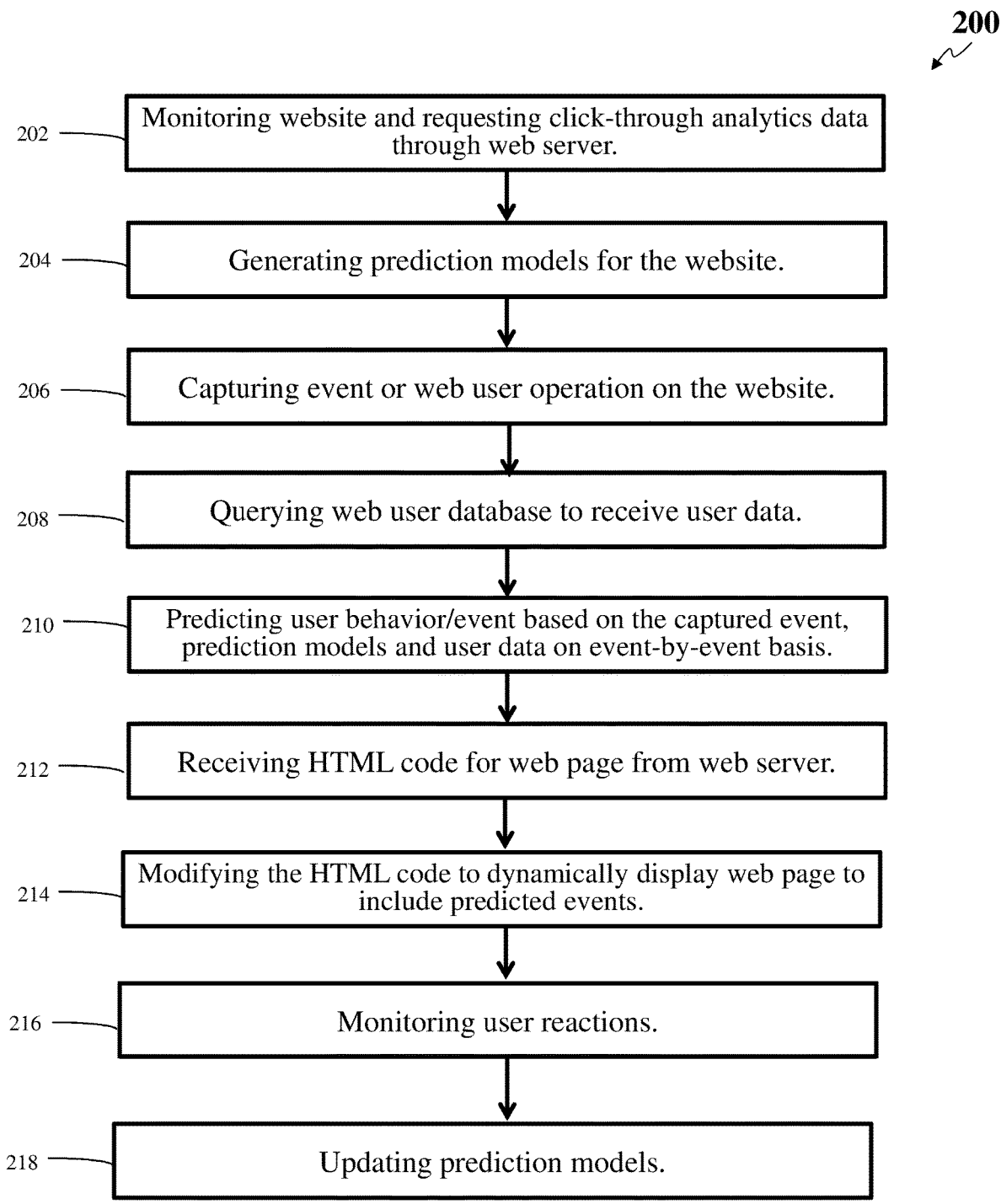
FIG. 2 illustrates a flowchart depicting operational steps for optimizing dynamic web application based on events, according to an embodiment.

FIG. 2 illustrates execution of a method 200 for optimizing dynamic web application based on events, according to an embodiment. Other embodiments may comprise additional or alternative steps, or may omit some steps altogether.

At step 202, the analytic server may continuously monitor a website and request click-through analytics data through the web server. When web users visit the website, the web server may monitor and collect the click-through analytics data from various web users. The click-through analytics data may not only include click through data on each component of the web pages (e.g., buttons, menus, dialog boxes, text boxes, checkboxes, forms, links, and other components), but also include the input contents. For example, the web server may extract the specific contents inputted by different web users in text boxes, forms, or other user interfaces displayed on web pages.

Furthermore, the click-through analytics data may include the sequences of events for each web user. For example, the web server may track the click stream and event flow of each web user's behavior, which is the series of operations performed by the web users. The click stream or event flow data may provide information on the patterns or trends of web users' behaviors, which may be further used to predict future event for web users. For example, based on the click stream or event flow, when a web user clicks on the "personal information" after clicking on the "lost and found" of a bank website, the analytic server may predict the web user is trying to order a new card. The analytic server may request such click-through analytics data from the web server and save the data into the prediction model database.

In some configurations, the analytic server may perform one or more steps of the method 200 as a background process and one or more steps of the method 200 as a foreground process. For instance, the analytic server may monitor the user's analytics data or other interactions with the website in a manner that is transparent to the user (e.g., as a background process). That is, the user may not be aware that the analytic server is monitoring his or her interactions with the website. In some embodiments, the analytic server may provide an option for the user to opt out of being monitored by the analytics server. For instance, the analytic server may display a graphical indicator indicating whether the analytic server is monitoring the user's interactions with the web site. The user, in turn, can instruct the analytic server to stop or start monitoring the user's interactions by interacting (e.g., clicking) with the indicator. In some configurations, unless instructed by the user, the analytics server may continue monitoring the user's interactions with the web site in a manner that is transparent to the user. The user may not be aware that the analytic server is monitoring the user's interactions until and unless the analytic server dynamically displays a user interface (e.g., dialog box), as described step 214.

At step 204, the analytic server may generate one or more prediction models for the website. The click-through analytics data gathered from web users may allow for the building of models that can use past actions (e.g., patterns of web site usage) to predict the future. In one embodiment, the analytic server may utilize the click-through analytics data for training the model to learn patterns hidden in the data and build prediction models by using artificial intelligence. The analytic server may apply predictive modeling techniques, including but are not limited to, neural networks (NNs), support vector machine (SVMs), decision trees, linear and logistic regression, clustering, association rules, and scorecards, to learn the patterns hidden in large volumes of historical data. When learning is completed, the result is a prediction model, which may be able to generalize the knowledge it learned and apply the knowledge to a new situation (e.g., a new user interacting with the website). For example, after the analytic server learned the pattern of web user behaviors based on the training of the click-through analytics data, the analytic server may apply the knowledge to predict the web user's intention when the web user clicks on a certain button/link. Accordingly, the analytic server may provide one or more options to include the services/operations corresponding to the web user's intention.

At step 206, the analytic server may capture the current event or web user operation on the website. The current event may be an interaction of the user and the website comprising at least one of a portion of the website viewed by the user and/or at least one hyperlink within the website selected by the user. The analytic server may continuously monitor the user activities associated with the current user interaction between the user and the website. Specifically, when a web user is visiting the website, each event occurred in the website is received by the web server. For example, the web server may determine the event based on the mouse cursor operations conducted on the web page components. The analytic server may capture such event or web user operation through the web server. The web user may conduct different operations (e.g., clicks on different web page components); these operations may comprise a flow of events. The analytic server may continue capturing each event and obtain the event flow accumulated during the period the web user is visiting/interacting with the website. To consider the dynamic change of the web user behavior, the prediction process running on the analytic server occurs every time the web user performs an operation. The prediction process may determine/identify a usage pattern (e.g., path) associated with the web user base on the current event and the flow of conducted events. For example, based on the current operation (e.g., click on a web page) and the previous conducted events (e.g., previous clicks on different web page components), the analytic server may be able to identify a path or a flow of events associated with the user.

At step 208, the analytic server may query the web user database to receive user data, which may help the analytic server predict the web user intention with higher accuracy. Because the web user database includes the basic information (e.g., age, gender, zip code) and the transaction data (e.g., products/services purchased, transaction date, items returned, and the like) regarding the web user, the analytic server may have a better understanding about the web user's needs based on the user data. In the interactions between the web users and the web server, the web server may collect the user data and store the data into the web user database. For example, the web server may collect the basic user information during the registration of the web users, and the web server may collect the transaction data when the users make a purchase. The web server may also update the web user database whenever there is a change.

To access the user data from the web user database, the analytic server may need authorization from the web server. For example, the analytic server may request the web server to provide the login and password associated with the database. Alternatively, the analytic server may request the web server to generate the authorization token and transmit the token to the analytic server.

To query the user data for a specific user, the analytic server may need to provide the user identifier. The analytic server may request the web server to provide the user identifier. The user identifier may comprise at least an authentication data associated with the user. In some embodiments, the web server may determine the user identifier for each user when they log into their accounts with their credentials. For example, when a registered web user visits the website, the web server may display a graphical user interface requesting the web user to enter credential information such as username, password, certificate, and biometrics. The web server may access a system database configured to store user credentials, which the web server may be configured to reference in order to determine whether a set of credentials (purportedly authenticating the user) match an appropriate set of credentials that identify and authenticate the user.

In some configurations, the analytic server may use a unique identifier associated with the client device displaying the website. For instance, the analytic server may query and retrieve an electronic identifier associated with the client device, such as MAC or IP address. Analytic server may then compare the retrieved unique identifier with a list of existing identifiers associated with each user device. In this way, the analytic server may determine the user operating the client device and interacting with the website.

While the web user database provides more information about the registered web users for the analytic server to better predict the web users' behaviors, this step is not required, especially for unregistered web users.

At step 210, the analytic server may predict next event or user behavior based on the captured current event, prediction models and user data on an event-by-event basis. The next event may be a future interaction of the user and the website. An event may be any operation performed on any component of a web page by a web user, including but is not limited to wiping, clicking, selecting, searching, typing, on buttons, menus, dialog boxes, text boxes, checkboxes, forms, links, and other web page components. In one or more embodiments, each event on the web page would trigger the prediction process. That is the prediction may be behavior driven or cursor driven.

The analytic server may treat each operation performed by the web server as a new situation and apply the prediction models to predict the next operation/event the web user would like to perform based on the current operation (e.g., captured event). Different web users may go through different flows of events; even the same web user may change intention and go to a different path. By providing event-by-event prediction, the analytic server may be able to consider the dynamic changes of web users' behaviors and redesign the click stream and/or event flow in real time at a micro scale. As a result, the analytic server may be able to provide the fine-grained prediction on each step (e.g., click) as the web users are visiting the websites. In some configurations, the next event may not be directly related (or otherwise directly tied to) to the user's monitored interactions with the website. For instance, an interactive graphical object may not correspond to a particular hyperlink on a webpage, but rather may be associated with content, text, image, or region of a webpage.

Furthermore, the analytic server may combine the offline data from the web user database and the online behavior during the prediction process. For example, the analytic server may determine the web user is looking for information related with some medicines based on the web user's online behavior. Moreover, the analytic server may further learn the age of web user from the web user database, and determine the user who is 62 years old. The analytic server may predict that the user is interested in medicines for elderly and recommend the most common medicines for senior people.

Moreover, the analytic server may consider the context of the web page during the prediction process. For example, when a web user is visiting a web page related with pain relief, the analytic server may predict the next event is related with the medicine for pain relief at a higher probability. In some embodiments, the analytic server may receive new or modified context via GUI provided on the web user electronic devices. For example, the web user may input the interested service/product on the GUI.

In addition, the analytic server may consider the web users' preferences during the prediction process. The analytic server may query the HTTP cookie from the web server to learn the users' web browsing history. An HTTP cookie (also called web cookie, Internet cookie, browser cookie, or simple cookie) is a small piece of data sent from the website and stored on the users' computer by the users' web browser while the user is browsing. Cookies were designed to be a reliable mechanism for websites to remember state information (such as items added in the shopping cart in an online store) or record the users' browsing activity (including clicking a particular button, logging in, or recording which pages were visited in the past). Based on the HTTP cookie, the analytic server may learn the users' preferences and backgrounds. For example, the analytic server may learn that the user is interested in medicine for pain relief, and the analytic server may predict the future events to be related with medicine for pain relief with a higher probability. The analytic server may determine the user is interested in medicine for pain relief because a number of web pages from the user's browsing history include the word "pain relief" more than a pre-determined threshold. In another embodiment, the analytic server may determine the web user is interested in medicine for pain relief, because the searching history includes the key words "medicine for pain relief."

At step 212, the analytic server may query and receive HTML code for the web page the user is visiting from the web server via authentication and authorization. In some embodiments, the analytic server may need authorization and need to be authenticated to have access to the HTML code of the web page. The analytic server may request the web server to generate the authorization token and transmit the token to the analytic server. The analytic server may obtain authorization using any other authentication methods. The analytic server may also have the authorization from the web server to modify the HTML code to include user interfaces reflecting the predicted results. In some other embodiments, the analytic server may host the websites. In other words, the analytic server may server as the web server, and have the authority to access and modify the HTML code for web pages.

At step 214, the analytic server may modify the HTML code and display the web page to include user interfaces corresponding to the predicted events. In one or more embodiments, the user interfaces may be an interactive hyperlink configured to transfer the user to a second web page corresponding to the next event. For example, when the analytic server predicts the web user is looking for medicine for pain relief, the analytic server may generate a user interface including the link to the web page introducing the medicine for pain relief. Alternatively, the user interface may be a text-based interface allowing the web user to enter manual commands. For example, when the analytic server predicts the web user is looking to change address, the analytic server may display a text box where the web user can input the new address. In some embodiments, the analytic server may provide more than one options based on the predicted events in the user interface. By modifying the HTML code, the analytic server may display the website to display the user interface next to the mouse cursor of the web user or in other part of the web page (e.g., the upper right corner of the web page) depending on the layout of the web page. Alternatively, the analytic server may redesign the layout of web page components to include the new user interface. For example, the web page may include one or more containers. Based on the prediction results, the analytic server may populate the one or more containers to include the corresponding user interface.

In some configurations, the analytic server may display the user interface (e.g., the dialogue box dynamically created based on the user's interactions with the website) as an overlay. For instance, the analytic server may not necessarily modify the content displayed on the web page; the analytic server may dynamically overlay the user interface on top of the existing content displayed on the web page, as depicted in FIG. 4B. In some configurations, the analytic server may modify the content of the web page itself. For instance, the analytic server may modify the HTML code to display the user interface instead of the content (or at least a portion of the content) displayed on the web page.

As discussed above, the analytic server may execute one or more steps of the method 200 in a transparent manner (e.g., in a background process and in a manner unknown to the user). When the analytic server identifies the next event based on the user's behavior (e.g., the user's interactions with the website), the analytic server may display the user interface (e.g., dialogue box) as a foreground process (e.g., in a manner that is known to the user).

The predicted events may be inside applications or outside applications or any combination thereof. The inside applications may be functions or operations within the websites. In other words, the inside applications are functions or operations provided by the websites. The outside applications may be a call center computing system or a virtual assistant server, such as a chatbot. The call center computing system may comprise human service representatives to provide human interference. In one embodiment, the analytic server may display the web page to include a button with call number. When the web users click on the button, the web users may directly chat and/or interface with a service representative. In another embodiment, the web users may interact with a chatbot instead of a human. Based on the predicted events, the analytic server may determine if the predicted events require human interaction, and further determine if the web users should be connected with a human or a virtual assistant. For example, if the predicted event is in high risk, the analytic server may determine the web user should talk to a service representative; otherwise, the analytic server may allow a virtual assistant to communicate with web users with regular requests.

At step 216, the analytic server may monitor the web users' reactions to the predicted events. The analytic server may query the web server hosting the websites to receive click-through analytics results associated with the predicted events. The analytic server may query the click-through analytics results upon each displaying of the web page. Alternatively, the analytic server may query the analytics results periodically (e.g., pre-determined time, a pre-determined number of clicks, or based on a time algorithm dependent on the click-through results). The analytic server may store such analytics results into the prediction model database. The click-through analytics results may provide statistic data to evaluate the accuracy of the predicted results. For example, if the user interface of one predicted event receives a click-through rate (CTR) that is less than a threshold, the analytic server may determine the predicted event is not accurate and the prediction model needs to be updated.

At step 218, the analytic server may update the prediction models based on the web users' reactions (e.g., interaction with the website). In one embodiment, when the click-through analytics results corresponding to a predicted event do not satisfy a threshold, the analytic server may retrain the prediction models by including the received click-through analytics results associated with the predicted events. In another embodiment, the analytic server may retrain the prediction model periodically (e.g., pre-determined time, a pre-determined number of clicks, or based on a time algorithm dependent on the click-through results). For instance, when the analytic server displays a graphical component corresponding to a predicted next event, the analytic server monitors whether the user interacts with the graphical component. If the user interacts with the graphical component, then the prediction model has predicted correctly. If the user does not interact with the graphical component, then the prediction model predicted incorrectly. In both cases, the analytic server may retrain the prediction model accordingly in a variety of back propagating methods.

By retraining the prediction models based on the web users' reactions to the predicted events, the new prediction models may generate new paths of web users' behaviors by updating the click stream and/or event flow. As a result, the new prediction models may better reflect the trend of web user behaviors, and improve the prediction accuracy.

Figure 3A:
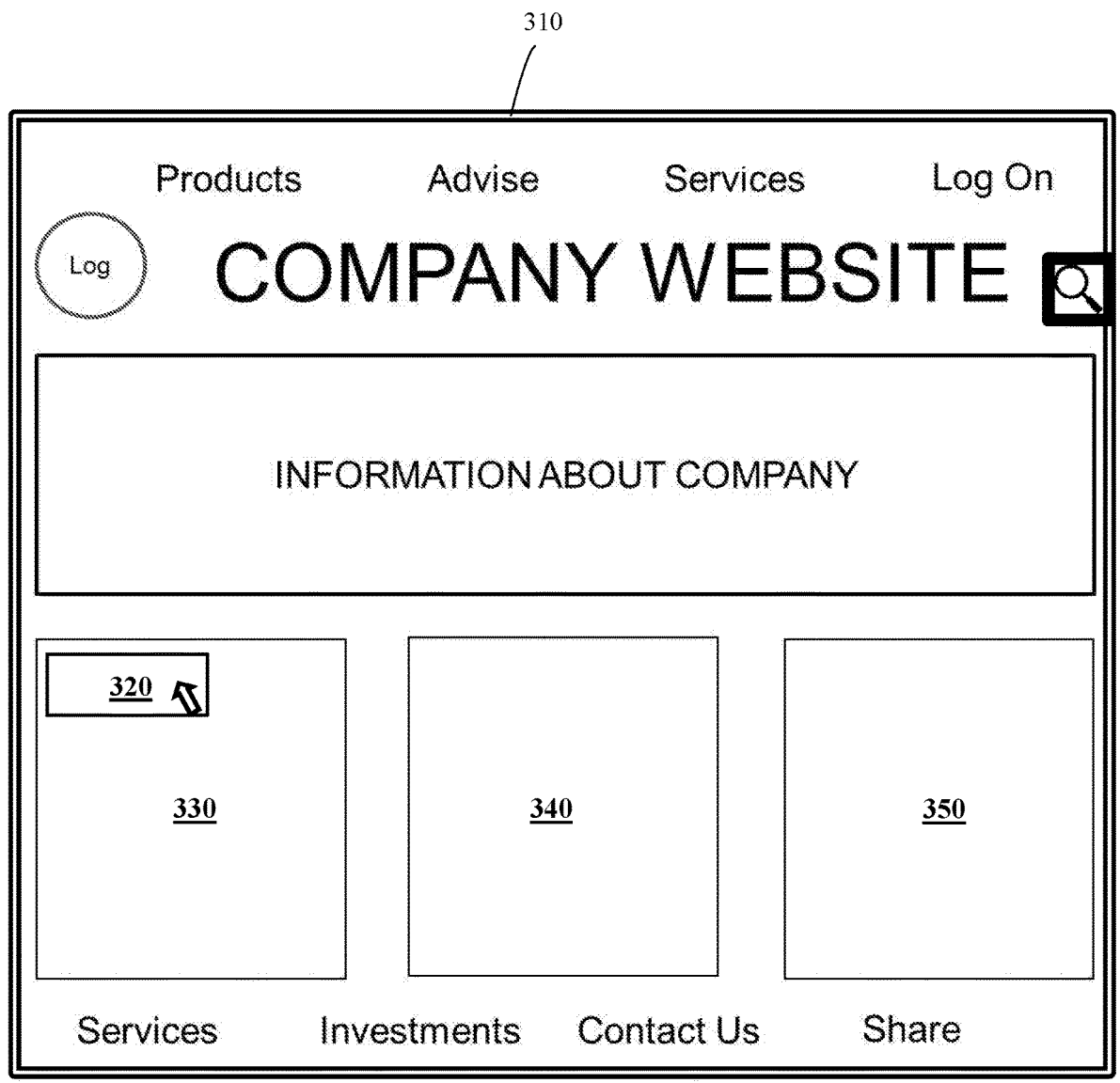
FIG. 3A illustrates an example of a current event in a web page, according to an embodiment.

FIG. 3A illustrates an example of a current event on a web page 310, according to an embodiment. The analytic server may display the web page 310 on the GUI of the web users' electronic device. The web page may include different sections 330, 340, 350 providing different contents or services, with each section 330, 340, 350 including buttons, hyperlinks, menus, text boxes, checkboxes, forms, and other components. When a web user visits the web page 310, the web user may click on different components. For example, the web user may interact (e.g., click, hover over, touch) with the button 320. The analytics server may consider this interaction as the "current event," as discussed above. The analytic server may capture such an event, and predict a next event based on the current event and prediction models.

Figure 3B:
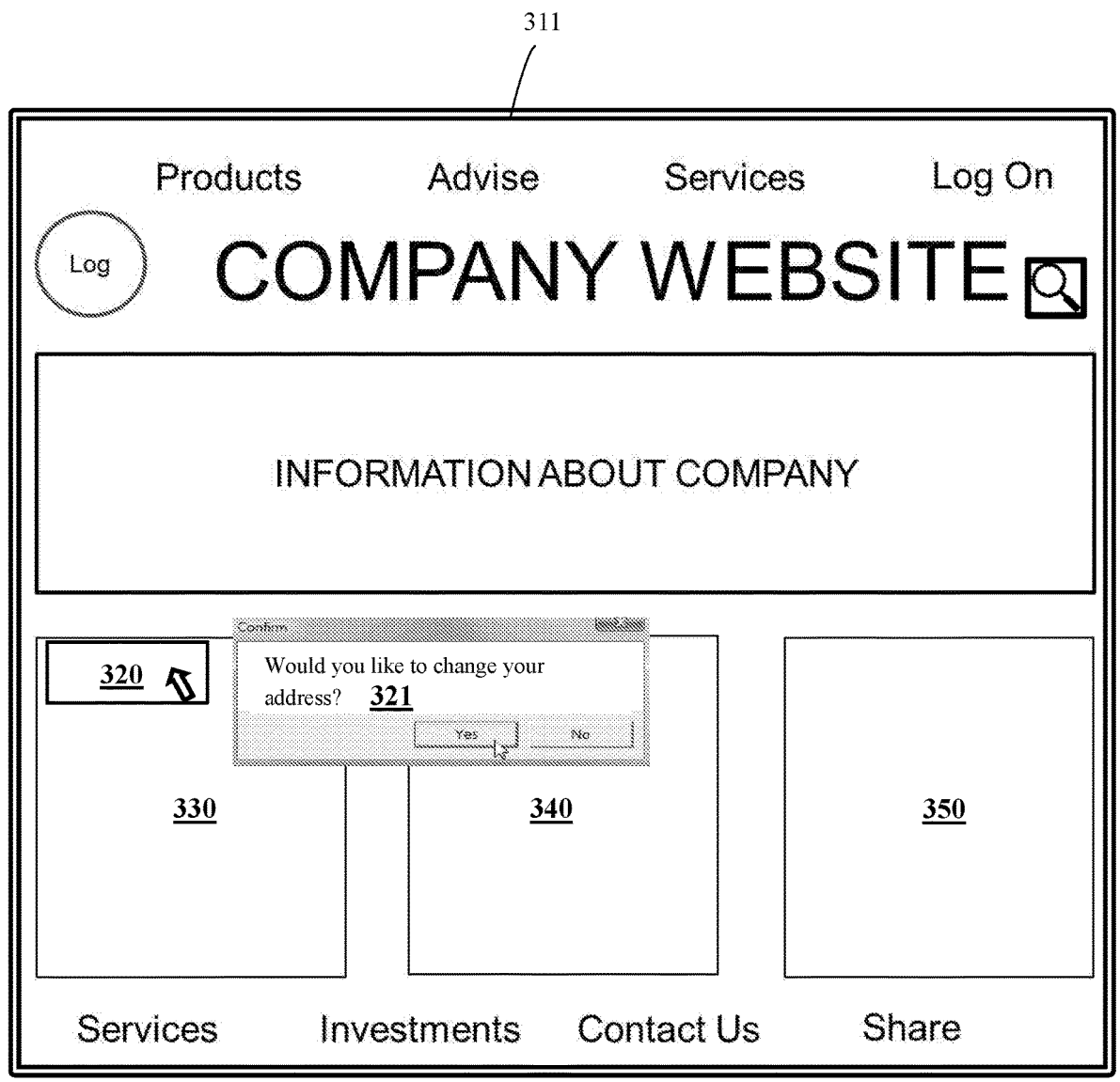
FIG. 3B illustrates an example of a predicted event based on the current event, according to an embodiment.

FIG. 3B illustrates an example of a predicted event in the web page 311, according to an embodiment. Based on the event of web user clicking on button 320, and in conjunction with the previous events (e.g., previous clicks on different web page components), the analytic server may apply the prediction model to predict the next event. For example, the analytic server may determine the web user is looking to change his/her address. The analytic server may modify the HTML, code to display the web page to include the predicted event. For example, the analytic server may display the web page to include a hyperlink to allow the web user to change his/her address. For instance, the analytic server may display a dialogue box asking the web user "would you like to change your address" 321, and display the dialogue box next to the mouse cursor in the web page. When the user interacts with the dialogue box 321, the user is then directed (via the analytic server or the web server) to a webpage that is configured to change the user's address. As described above, the "next event" may not be directly related to the "current event." For example, the dialogue box 321 may not be related to the button 320. In other words, by interacting (e.g., clicking) on the box 320 (or a hyperlink associated with the box 320), the web server of the web page 311 (or the analytic server) may not direct the user to the same webpage that the user would be if that the user interacted with the dialogue box 321. In some configurations, the analytic server may display the dialogue box 321 in other locations within the web page 311. For instance, the dialogue box may be displayed in the right, left, bottom, or top corners of the web page 311.

Once the web user confirms to change address by clicking a corresponding button in the dialogue box, the analytic server may direct or transfer the web user to the web page of changing address. The analytic server may display the predicted event in other forms (e.g., a button, a text box, or otherwise a graphical component). For example, when the analytic server predicts the web user is looking to change address, the analytic server may display a text box where the user can input the new address.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   monitoring, by a server, an interaction with a first webpage of a website displayed on an electronic device during a browsing session, the interaction with the first webpage associated with a hyperlink presented on a second webpage of the website, where the hyperlink is not included within the first webpage;
   executing, by the server, a prediction model using the interaction with the first webpage monitored by the server;
   receiving, by the server from the prediction model, an indication of the hyperlink;
   upon receiving the indication of the hyperlink from the prediction model, presenting, by the server on the first webpage displayed on the electronic device during the browsing session, an interactive graphical component comprising an interactive hyperlink corresponding to the second webpage; and
   in response to receiving an indication of an interaction with the interactive graphical component, navigating, by the server, the electronic device to the second webpage.

2. The method of claim 1, further comprising:
   retrieving, by the server, data associated with a user conducting the interaction with the first webpage; and
   applying, by the server, data associated with the user to the prediction model.

3. The method of claim 1, wherein the prediction model is generated based on click-through data associated with the website.

4. The method of claim 3, further comprising:
   updating, by the server, the prediction model using new click-through data associated with the website.

5. The method of claim 1, wherein the second webpage corresponds to interacting with at least one of a calling center, a customer service representative, or a chatbot.

6. The method of claim 1, wherein the prediction model further applies data associated with context of the website.

7. The method of claim 1, wherein the prediction model is an artificial intelligence model.

8. The method of claim 1, wherein presenting the interactive graphical component comprises revising code associated with the website.

9. The method of claim 1, further comprising:
   retrieving, by the server, browsing history associated with the electronic device; and
   applying, by the server, the browsing history to the prediction model.

10. A system comprising:
    a server comprising a processor and a non-transitory computer-readable medium containing instructions that when executed by the processor causes the processor to perform operations comprising:
       monitor an interaction with a first webpage of a website displayed on an electronic device during a browsing session, the interaction with the first webpage associated with a hyperlink presented on a second webpage of the website, where the hyperlink is not included within the first webpage;

execute a prediction model using the interaction with the first webpage monitored by the server;

receive, from the prediction model, an indication of the hyperlink;

upon receiving the indication of the hyperlink from the prediction model, present, on the first webpage displayed on the electronic device during the browsing session, an interactive graphical component comprising an interactive hyperlink corresponding to the second webpage; and in response to receiving an indication of an interaction with the interactive graphical component, navigate the electronic device to the second webpage.

11. The system of claim 10, wherein the instructions further cause the processor to retrieve data associated with a user conducting the interaction with the first webpage; and apply data associated with the user to the prediction model.

12. The system of claim 10, wherein the prediction model is generated based on click-through data associated with the website.

13. The system of claim 12, wherein the instructions further cause the processor to update the prediction model using new click-through data associated with the website.

14. The system of claim 10, wherein the second webpage corresponds to interacting with at least one of a calling center, a customer service representative, or a chatbot.

15. The system of claim 10, wherein the prediction model further applies data associated with context of the website.

16. The system of claim 10, wherein the prediction model is an artificial intelligence model.

17. The system of claim 10, wherein presenting the interactive graphical component comprises revising code associated with the website.

18. The system of claim 10, wherein the instructions further cause the processor to retrieve browsing history associated with the electronic device; and apply the browsing history to the prediction model.

19. A system comprising:

an electronic device configured to access a website having a first webpage and a second webpage; and a server in communication with the electronic device, the server configured to:

monitor an interaction with the first webpage of the website displayed on the electronic device during a browsing session, the interaction with the first webpage associated with a hyperlink presented on the second webpage of the website, where the hyperlink is not included within the first webpage;

execute a prediction model using the interaction with the first webpage monitored by the server;

receive, from the prediction model, an indication of the hyperlink;

upon receiving the indication of the hyperlink from the prediction model, present, on the first webpage displayed on the electronic device during the browsing session, an interactive graphical component comprising an interactive hyperlink corresponding to the second webpage; and in response to receiving an indication of an interaction with the interactive graphical component, navigate the electronic device to the second webpage.

20. The system of claim 19, wherein the server is further configured to retrieve data associated with a user conducting the interaction with the first webpage; and apply data associated with the user to the prediction model.

* * * * *